Sept. 15, 1936. G. EGLOFF Re. 20,109
PROCESS FOR CRACKING HYDROCARBON OILS
Original Filed Feb. 1, 1923
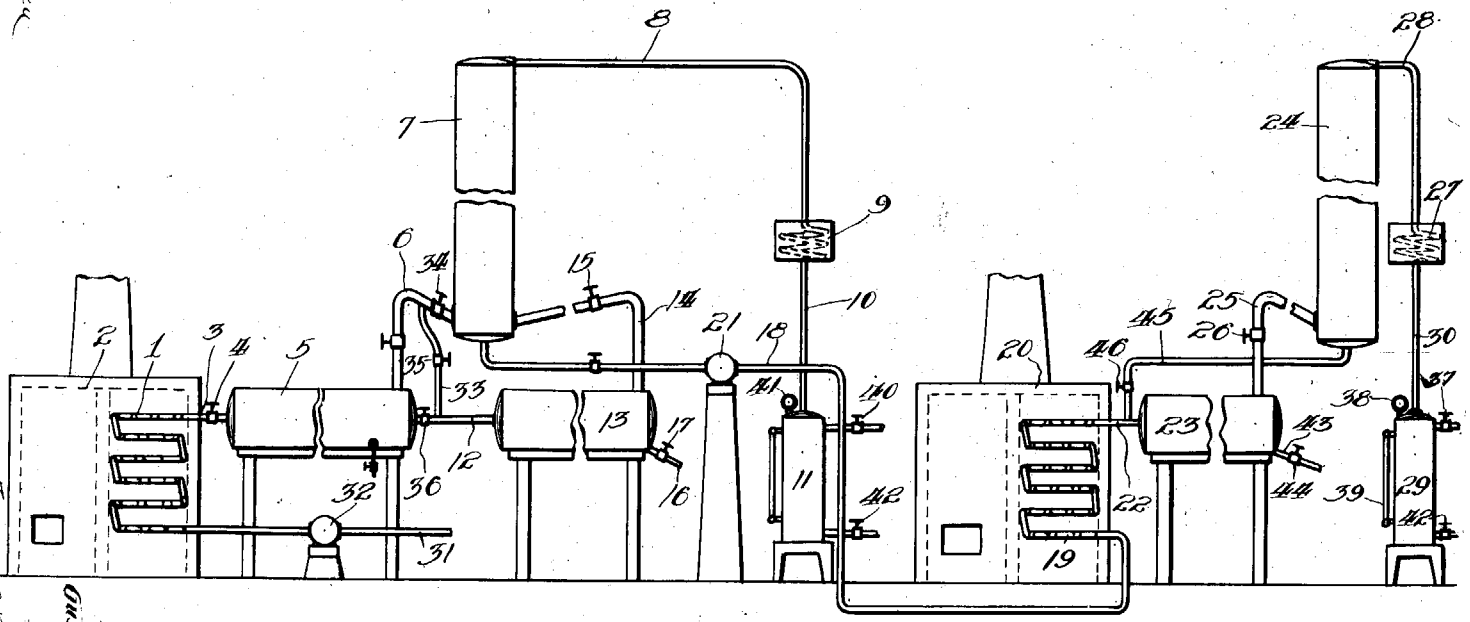
Witness:
Stephen H. Ribou
Inventor:
Gustav Egloff,
by Frank L. Belknap Atty.

Reissued Sept. 15, 1936 Re. 20,109

UNITED STATES PATENT OFFICE 20,109

PROCESS FOR CRACKING HYDROCARBON OILS

Gustav Egloff, Chicago, Ill., assignor, by mesne assignments, to Universal Oil Products Company, Chicago, Ill., a corporation of Delaware Original No. 1,852,961, dated April 5, 1932, Serial No. 616,382, February 1, 1923. Renewed May 13, 1929. Application for reissue February 8, 1934, Serial No. 710,381

7 Claims. (Cl. 196—49)

This invention relates to improvements in a process and apparatus for cracking hydrocarbon oils and refers more particularly to the treatment of petroleum hydrocarbons to produce low boiling point oils such as gasoline.

Among the objects of the invention are to provide a process in which the oil is successively treated in separate stages to produce an increased yield of high grade distillate; to provide a process which is preferably operated under a substantial pressure, and, in general, to provide a process and apparatus of the character referred to.

The single figure is a diagrammatic side elevational view of the apparatus.

At 1 is shown a heating coil mounted in a furnace 2 and connected by a transfer line 3, controlled by a valve 4, to a vaporizing chamber 5. This chamber communicates through a vapor line 6 with a dephlegmating column 7 which, in turn, has connection through a line 8 to a condenser coil 9. This condenser coil, in turn, is connected by a line 10 to a receiver 11. The liquid draw-off line from the chamber 5 has communication through a pipe 12 with a secondary vaporizing chamber 13, which has a vapor line 14 controlled by a valve 15, connected to the dephlegmator 7, and a liquid draw-off line 16, controlled by a valve 17, for removing the unvaporized liquids therefrom.

The dephlegmator 7 has a draw-off line 18 connected to the heating coil 19, mounted in a furnace 20. A pump 21 is interposed in the line 18 for regulating the flow of the liquid. The heated oil from the coil 19 is directed through the transfer line 22 to the chamber 23 where the substantial part of the conversion of the oil takes place. Chamber 23 is connected with a dephlegmating column 24 by means of a pipe 25 controlled by a valve 26. The dephlegmating column 24 has communication with the condenser coil 27 through the line 28, and the coil 27 is, in turn, connected to a receiving tank 29 by a line 30.

Referring now to the method of treating the oils, a charging stock is introduced from any convenient source through the line 31 and is charged by the pump 32 through the coil 1, during which circulation it is raised to a conversion temperature. The oil is thence passed to the chamber 5 where it is maintained in a substantial body and a separation of the liquid and volatile portions takes place, the vapors passing off through the line 6 which has connection with the dephlegmator 7 and also with the line 12 through a secondary line 33. The travel of the vapors may be controlled by manipulation of the valve 34 in the line 6 and the valve 35 in the line 33; that is, the vapors may be directed to the dephlegmating column 7 by closing the valve 35 and opening the valve 34, or the vapors may be diverted back and combined with the unvaporized liquid withdrawn from the chamber 5 by closing the valve 34 and opening the valve 35. By operating in this manner, the fluid portions including the liquid and vapors from the chamber 5 may be directed into the secondary conversion or vaporizing chamber 13.

In any case, the oil constituents collected in the chamber 13 undergo further conversion due to the reduction of pressure regulated by the valve 36 in the line 12. The vaporous products separated from the oil body in the chamber 13 rise through the vapor line 14 and are conducted to the dephlegmating tower 7 where they are subjected to a refluxing action. After being dephlegmated in this tower, the vapors pass over and are collected as distillate in the receiver 11.

The reflux condensate separated out in the dephlegmating column is withdrawn through the pipe 18 and is charged by means of the pump 21 into the heating coil 19, where it may be subjected to increased pressure and temperature conditions to produce further conversion and cracking of this refractory product. The oil, after being heated in the coil 19, is collected in the chamber 23 in a similar manner as the initial charge was collected in the chamber 5. The volatile fractions separated from the oil body pass off through the vapor line 25 and are dephlegmated and condensed in the stages 24 and 27 respectively, and finally collected as liquid distillate in the receiver 29. The receiver is equipped with a pressure relief valve 37, a liquid level gauge 39, and a pressure gauge 38 for controlling the conditions of cracking in that portion of the apparatus having to do with the treatment of the reflux condensate. In a like manner, the receiver 11 is equipped with a pressure relief valve 40 and a pressure gauge 41 and a liquid draw-off 42 for controlling the conditions in the initial stages of treatment. Both of the receivers are equipped with draw-off lines controlled by valves 42 for withdrawing the liquid distillates from the system. The chamber 23 has a residual draw-off line 43 controlled by a valve 44, by means of which the unvaporized liquid may be withdrawn from the chamber to maintain a desired level therein.

The advantages of the process lie in the fact that the oil charged to the system may first be treated to a relatively high pressure and relieved of a substantial portion of its volatile fractions. The unvaporized liquid may then be treated under reduced pressure and the vapors combined with those produced in the initial stage to obtain what amounts to a high grade blended distillate. It is essential, of course, that the dephlegmation of the combined vapors from the initial and secondary stages of conversion take place under a reduced pressure or substantially the pressure maintained in the secondary stage 13. The reflux condensate, then, is passed on and separately treated, as it is a more refractory oil to crack and for this reason must be treated under increased pressure and temperature conditions. That portion of the apparatus utilized to re-run the reflux condensate comprises the heating, vaporizing, dephlegmating and condensing elements serially connected with a run-back line shown at 45 controlled by a valve 46 to re-cycle the condensate separated in the dephlegmator 24 to the discharge end of the heating coil where it is combined with the hottest oil being delivered from the heating coil 19.

By treating a Mid-Continent gas oil of approximately 32° Baumé to temperatures ranging from 700° to 900° F., in the initial heating stage and maintaining a pressure of 500 pounds more or less on the initial heating and conversion stages, then permitting further conversion under a reduced pressure of 200 pounds in the chamber 13, a good quality distillate having a gravity of approximately 52° Baumé and comprising substantially thirty-five per cent (35%) of the oil treated, may be obtained. The reflux condensate may be treated under conditions necessary to extract a further yield of low boiling point hydrocarbon therefrom, which, under proper operating conditions, may range as high as twenty per cent (20%) of the oil treated.

I claim as my invention:—

1. A process for cracking hydrocarbons consisting in heating the oil to a cracking temperature, discharging the heated oil into a primary reaction zone where vaporization takes place, maintaining a pressure above atmospheric on the heating and primary reaction zones, subjecting the heated oil to further reaction under reduced pressure in a secondary reaction zone, in combining the vapors separated from the oil in said reaction zones and in then subjecting them to a dephlegmating action, subjecting the separated reflux condensate to higher temperature and pressure conditions to produce further conversion into vapors, condensing said vapors and collecting separately the distillate obtained from the conversion of the reflux condensate.

2. A process for converting hydrocarbon oils, consisting in maintaining a body of hydrocarbon oil under cracking conditions of temperature and pressure in a zone wherein substantial vaporization occurs, in removing the vaporous constituents and the unvaporized constituents from said enlarged zone, in admitting the unvaporized constituents to a second enlarged zone, wherein an additional vaporization is effected due to a decrease in the pressure maintained in said second enlarged zone, below that maintained in the first zone, in uniting the vapors released from the oil in said enlarged zones and subjecting the united vapors to a reflux condensing action, in separately treating the reflux condensate separated from such vapors under higher conditions of temperature and pressure than is maintained on the oil in either of said enlarged zones.

3. A process for converting hydrocarbon oils consisting in maintaining a body of hydrocarbon oil under cracking conditions of temperature and pressure in a zone wherein substantial vaporization occurs, in removing the vaporous constituents and the unvaporized constituents from said enlarged zone, in admitting the unvaporized constituents to a second enlarged zone, wherein an additional vaporization is effected due to a decrease in the pressure maintained in said second enlarged zone, below that maintained in the first zone, in uniting the vapors released from the oil in said enlarged zones and subjecting the united vapors to a reflux condensing action, under a pressure lower than the pressure maintained in either of said zones, in separately treating the reflux condensate separated from said vapors under higher conditions of temperature and pressure than is maintained on the oil in either of said enlarged zones.

4. A conversion process which comprises heating hydrocarbon oil to cracking temperature under pressure while flowing in a restricted stream through a heating zone and effecting substantial cracking of the oil in this zone, discharging the heated oil into an enlarged reaction zone maintained under cracking conditions of temperature and pressure, removing vapors and unvaporized oil from the reaction zone and flash distilling the latter in a second enlarged zone by pressure reduction, introducing the vapors withdrawn from the reaction to said second zone thereby forming a mixture thereof with the flashed vapors evolved from said unvaporized oil, removing the vaporous mixture from said second zone and fractionating the same to form a composite reflux condensate of heavier fractions of the flashed vapors and the vapors withdrawn from the reaction zone, and separately treating such composite condensate in an independent heating zone at higher temperature than the oil in the first-mentioned heating zone.

5. A hydrocarbon oil conversion process which comprises introducing the charging oil to a conversion zone maintained under cracking conditions of temperature and pressure and effecting substantial cracking of the oil in this zone, simultaneously cracking a more refractory and relatively clean oil, formed as hereinafter set forth, in an independent conversion zone maintained at higher cracking temperature than the first-named zone, preventing commingling of said oils during their cracking in said zones whereby to crack the charging oil under conditions controlled independently of those employed in said cracking of the more refractory oil, removing vapors and unvaporized oil from the first-named zone and flash distilling the latter in an enlarged zone by pressure reduction, introducing the vapors withdrawn from the first-named zone to said enlarged zone thereby forming a mixture thereof with the flashed vapors evolved from the unvaporized oil, removing the vaporous mixture from said enlarged zone and fractionating the same to form a composite reflux condensate of heavier fractions of the flashed vapors and of the vapors withdrawn from the first-named zone, and supplying such composite condensate to said independent conversion zone as said more refractory and relatively clean oil.

6. The process as defined in claim 4 further characterized in that the vapors and unvaporized oil removed from said reaction zone are introduced as a mixture to said second enlarged zone.

7. The process as defined in claim 5 further characterized in that the vapors and unvaporized oil withdrawn from the first-named zone are introduced as a mixture to said enlarged zone.

GUSTAV EGLOFF.